Sept. 19, 1944.  A. MAHREN  2,358,462

MEASURING DEVICE

Filed July 30, 1943

INVENTOR.
ARTHUR MAHREN

BY
ATTORNEY

Patented Sept. 19, 1944

2,358,462

UNITED STATES PATENT OFFICE 2,358,462

MEASURING DEVICE

Arthur Mahren, Long Island City, N. Y., assignor to Federal Telephone and Radio Corporation, Newark, N. J., a corporation of Delaware Application July 30, 1943, Serial No. 496,825

5 Claims. (Cl. 175—183)

This invention relates to improvements in measuring devices, and more particularly to a device for measuring and testing the properties of dielectric materials at extremely high frequencies.

Various tests and testing devices have long been known for ascertaining the dielectric constant, power factor, susceptance and other properties of dielectric materials. To date, however, most of these various devices and instrumentalities have been designed to work at relatively low frequencies and are either inaccurate or impossible to use at ultra-high frequencies, for example, frequencies in the range of 100 to 1000 megacycles.

It is the primary purpose of the present invention to provide a device by means of which the important characteristics of dielectric materials at ultra-high frequencies can be properly determined and measured.

More specifically, this invention is directed to the provision of a novel dielectric testing device incorporated in a resonant cavity, such as a coaxial line.

These and other features of the invention will be best understood and appreciated from the following description of a preferred embodiment thereof described for purposes of illustration, and shown in the accompanying drawing in which.

Figure 3:
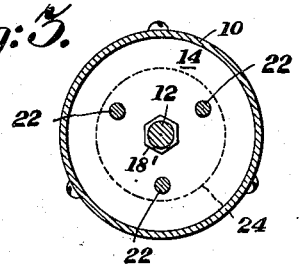
Fig. 3 is a transverse cross-sectional view taken along the line 3—3 of Fig. 1.

The device according to the present invention consists essentially of cavity resonator means in the form of a coaxial line. As is most clearly shown in Fig. 1, this may be constructed of a hollow metal cylinder 10 surrounding a central, coaxial shaft 12 which may be supported within the cylinder by a metal disk or plate 14 attached to one end of the cylinder and an insulating plate 16 positioned inwardly from the other end of the cylinder. Longitudinal movement of the shaft 12 may be prevented by threading one end thereof and removably attaching this end to the plate 14 as by nuts 18, 18'. It will be desirable to tune the resonant line to the frequency at which the dielectric is to be tested, and for this purpose I provide an internal metal disk 20 slidably on the shaft 12 and having a series of peripheral spring fingers 21 bearing against the inside of the cylinder 10. Movement of the disk 20 may be controlled by spaced rods 22 shown in Figs. 1 and 3, passing through suitable openings in the end plate 14 and threaded into the disk 20. The outer ends of the rods 22 may be interconnected by a metal disk 24, as by nuts 26 to provide a control handle for sliding the disk within the cylinder 10 to the position desired.

The end of the cylinder 10 opposite to the end plate 14 contains further means for tuning the resonant lines and for holding the dielectric sample to be tested. Such means may include, in the first place, a pair of spaced apart plates 28 and 30 comprising a first vernier capacitor $C_1$. The plate 28 may be attached to the shaft 12 as by threaded extension 32, while the plate 30 is preferably attached to the shaft 34 of a micrometer 36, through means such as set screw 37. The micrometer 36 as a whole is mounted on the outside of the cylinder 10 through a supporting block 38 and screws 40, the shaft 34 thereof projecting radially inwardly to support the plate 30. It will be clear to those skilled in this art that as the micrometer 36 is rotated, the relative distance between the plates 28 and 30 may be varied as desired, and this distance may be found by suitable calibrations on the micrometer itself.

Preferably diametrically opposite the variable condenser $C_1$ are positioned a second pair of larger plates 42 and 44 forming a receptacle for the sample of dielectric to be tested as well as a second capacitor $C_2$. The inner plate 42 may be directly attached to the shaft 12, as by threaded extension 46, while the outer plate 44 is attached to the shaft 48 of a second micrometer 50. Means such as set screw 51 may be used for this purpose. The micrometer 50 is supported on the outside of the metal cylinder 10 similarly to the micrometer 36 as by supporting block 52 and attaching screws 54. The shaft 48 extends radially inwardly of the cylinder for connection with the plate 44. The sample of insulating or dielectric material 56 to be tested is placed between the two plates 42 and 44.

Figure 2:
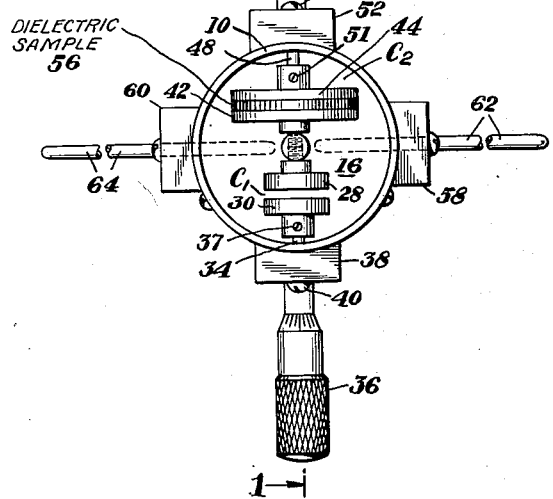
Fig. 2 is an end view of the device illustrated in Fig. 1.

As is more clearly shown in Fig. 2, I also provide means whereby high frequency current may be supplied to the resonant line oscillator, and also means whereby an output may be derived from the resonant line. Such means may consist of probes or loops 62 and 64 respectively attached to the outside of the cylinder 10 by supporting blocks 58 and 60. The elements 62 and 64 will project through suitable openings in the cylinder 10 to a sufficient distance to form a coupled connection therewith.

Figure 1:
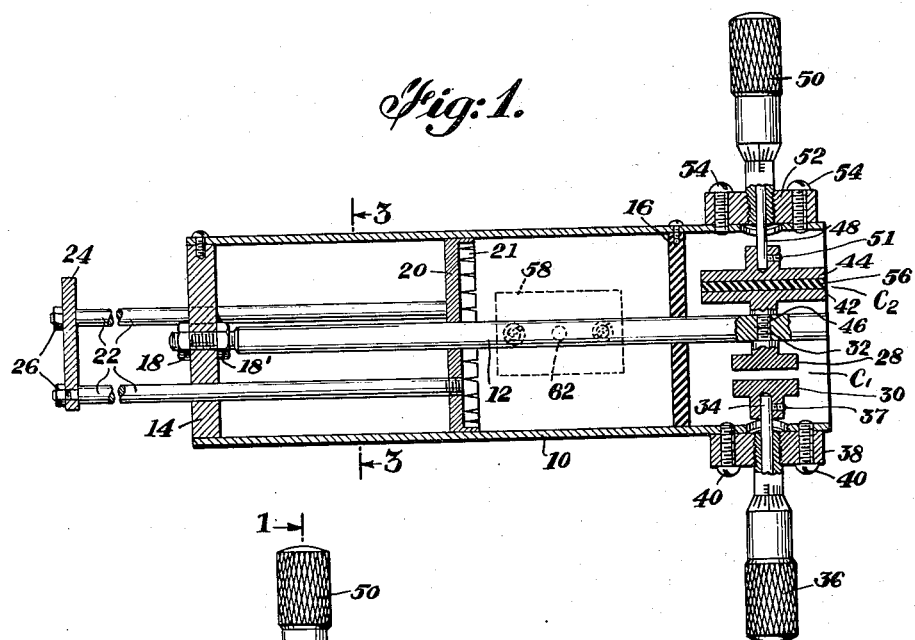
Fig. 1 is a longitudinal cross-sectional view of a preferred form of measuring device, the section being taken along the line 1—1 of Fig. 2.
Figure 4:
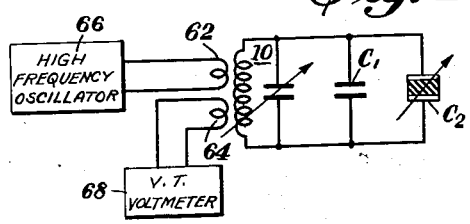
Fig. 4 is a circuit diagram, partially in block form, illustrating the equivalent circuit of my testing device, together with its external circuit connections to apparatus forming the complete testing equipment.

The device according to this invention can be used with known tested methods and the equivalent circuit connections are similar to those already proposed for testing and measuring at lower frequencies. As shown in Fig. 4, a high frequency oscillator 66 of any well-known type is coupled to the resonant line formed by the cylinder 10 through the probe 62 in any suitable manner. The voltage developed in the oscillator may be measured by means of a vacuum tube voltmeter also coupled to the resonant line to the intermediation of the probe 64. While it is possible to use various known methods for measuring the properties of the dielectric material to be tested, such as the change-of-voltage procedure and the change-of-frequency procedure, I will merely briefly describe by way of example the manner in which the aforedescribed apparatus may be used in accordance with the change-of-capacitance. Noting that the condensers $C_1$ and $C_2$, while diametrically opposite in Fig. 1 are electrically in parallel as seen in Fig. 4, the sample of dielectric material 56 to be tested is placed and clamped between the plates 42 and 44 of the capacitor $C_2$. The smaller condenser $C_1$, acting as a vernier, is maintained in a neutral position and the resonant line is tuned by varying the position of the slidable disk 20 so that the circuit resonates at the desired frequency. The maximum output voltage at this frequency is noted and the vernier condenser $C_1$ is changed until the voltage is reduced to .707 of the maximum reading, first on one side and then on the other of the resonant point. The corresponding values of capacitance at the two reduced points for the condenser $C_1$ are noted and recorded, and the condenser is then retuned until the maximum resonant setting has been restored.

After removing the dielectric specimen the circuit is returned to resonance by tuning of the condenser $C_2$, the setting of the disk 20 and of the condenser $C_1$ remaining unchanged. The maximum voltage is again noted and the capacitance $C_2$ recorded. Again the circuit is detuned by the vernier condenser $C_1$ to each side of resonance to a voltage reading of .707 of the second maximum voltage without the specimen. The corresponding vernier capacitance at these reduced voltage points are again recorded.

By this procedure tan $\delta_x$ can be calculated from the formula $$\frac{\Delta C_a - \Delta C_o}{2C_x}$$

where:

$\Delta C_a = C_a - C'_a$, these being two capacitances at the respective .707 voltage readings when the specimen to be tested is between the plates of condenser $C_2$;

$\Delta C_o = C_o - C'_o$, these being the capacitances at the respective .707 voltage values when the specimen has been removed; and $$C_x = C_r - C'_y + C'_z$$

In this case, $C_x$=capacitance of the specimen, in micro-microfarads;

$C_r$=calibration capacitance of the parallel plate capacitor $C_2$ at the second resonance adjustment, $C'_y$=calibration capacitance of the parallel-plate capacitor $C_2$ at the setting when it held the specimen, and $C'_z$=calculated capacitance of $C_2$ at the setting when it held the specimen.

As previously stated, the above formula for calculating tan $\delta_x$ are the same as have been previously proposed for testing circuits at lower frequencies and may be found, for example, in the "Standards on Electrical Insulating Materials" published by the American Society for Testing Materials (1942).

It will thus be seen that I have provided a testing device which, while making use of known testing methods is so designed as to permit the accurate testing of insulating materials at frequencies which were beyond the range of prior instruments. While I have described above the principles of my invention in connection with specific apparatus, it is to be clearly understood that this description is made only by way of example. Various changes in details of construction within the scope of my invention as set forth in the objects and the accompanying claims will be obvious to those skilled in this art.

I claim:

1. A device for measuring the properties of dielectric materials at high frequencies comprising a hollow metal cylinder, a metal shaft extending coaxially to said cylinder, said cylinder and shaft forming a concentric resonant line, means for tuning said line, a plurality of plates attached to diametrically opposite sides of said shaft near its end within and adjacent to an end of the cylinder, a first, movable plate supported from said cylinder, spaced from and parallel to one of said pair of plates, forming a variable condenser, and a second plate supported from said cylinder, spaced from and parallel to the other of said pair of plates and adapted to enclose a specimen of dielectric material between them, and input and output coupling means attached to said resonant line.

2. A device for measuring the properties of dielectric materials at high frequencies, comprising a hollow metal cylinder, a metal disk closing one end of said cylinder, a metal shaft attached at one end to said metal disk and extending coaxially to said cylinder, a spring disk slidable on said shaft and having its periphery slidably engaging the inside of said cylinder, whereby said cylinder, shaft, metal disk and slidable disk form a concentric resonant line, a plurality of plates attached to diametrically opposite sides of said shaft near its other end, a first, movable plate supported from said cylinder, spaced from and parallel to one of said pair of plates, forming a variable condenser, and a second movable plate supported from said cylinder, spaced from and parallel to the other of said pair of plates and adapted to enclose a specimen of dielectric material between them, and input and output coupling means attached to said resonant line.

3. The combination according to claim 2, in combination with a pair of micrometers mounted on the outside of said cylinder, having their shafts extending radially inwardly and respectively attached to said movable plates.

4. The combination according to claim 2, in combination with a plurality of rods secured to said slidable disk at one end and passing through said metal disk to the outside of said cylinder, and means holding the outer ends of said rods together and serving as a handle for adjusting the position of said slidable disk within the cylinder to vary the tuning of the resonant line.

5. The combination according to claim 2, in which all of said plates comprise flat cylindrical disks, and in which the two spaced plates forming the variable condenser have a smaller diameter than the plates on opposite sides of the sample to be tested.

ARTHUR MAHREN.